United States Patent
Takeda et al.

(10) Patent No.: US 10,698,148 B2
(45) Date of Patent: Jun. 30, 2020

(54) POLARIZING ELEMENT AND METHOD OF PRODUCING SAME

(71) Applicant: Dexerials Corporation, Shinagawa-ku, Tokyo (JP)

(72) Inventors: Tomu Takeda, Tome (JP); Hideto Sagawa, Tome (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 168 days.

(21) Appl. No.: 15/769,155

(22) PCT Filed: Oct. 24, 2016

(86) PCT No.: PCT/JP2016/004673
§ 371 (c)(1),
(2) Date: Apr. 18, 2018

(87) PCT Pub. No.: WO2017/073044
PCT Pub. Date: May 4, 2017

(65) Prior Publication Data
US 2018/0299602 A1    Oct. 18, 2018

(30) Foreign Application Priority Data

Oct. 28, 2015  (JP) ................................ 2015-212023

(51) Int. Cl.
*G02B 5/30*        (2006.01)
*G02F 1/1335*      (2006.01)
*B29D 11/00*       (2006.01)

(52) U.S. Cl.
CPC ...... *G02B 5/3058* (2013.01); *B29D 11/00644* (2013.01); *G02B 5/30* (2013.01);
(Continued)

(58) Field of Classification Search
None
See application file for complete search history.

(56) References Cited

U.S. PATENT DOCUMENTS

| 8,416,371 B2 * | 4/2013 | Kumai | G02B 27/283 349/96 |
| 9,977,168 B2 * | 5/2018 | Kumai | G02B 5/3058 |

(Continued)

FOREIGN PATENT DOCUMENTS

| CN | 102289021 A | 12/2011 |
| JP | H1073722 A | 3/1998 |

(Continued)

OTHER PUBLICATIONS

May 11, 2018, International Preliminary Report on Patentability issued in the International Patent Application No. PCT/JP2016/004673.
Feb. 16, 2016, Notification of Reasons for Refusal issued by the Japan Patent Office in the corresponding Japanese Patent Application No. 2015-212023.
Jan. 17, 2017, International Search Report issued in the International Patent Application No. PCT/JP2016/004673.
(Continued)

*Primary Examiner* — Derek S. Chapel
(74) *Attorney, Agent, or Firm* — Kenja IP Law PC

(57) ABSTRACT

Provided is a polarizing element having a wire grid structure. The polarizing element includes a transparent substrate (11) and grid-shaped protrusions (10) that are arranged on the transparent substrate (11) at a smaller pitch than a wavelength of operating band light and that extend in a specific direction. The grid-shaped protrusions (10) include a reflection layer (12) formed on the transparent substrate (11). The reflection layer (12) includes a metal layer (15) and an oxide layer (16) that covers a side surface of the metal layer (15) as viewed in the specific direction and is formed from an oxide of a constituent metal of the metal layer (15).

7 Claims, 5 Drawing Sheets

(52) U.S. Cl.
CPC .................. *G02F 1/133528* (2013.01); *G02F 2001/133548* (2013.01)

(56) References Cited

U.S. PATENT DOCUMENTS

| | | | | |
|---|---|---|---|---|
| 2011/0170187 A1* | 7/2011 | Sawaki | ................ | G02B 5/3058 359/485.03 |
| 2012/0105745 A1* | 5/2012 | Kumai | ................ | G02B 5/3058 349/5 |
| 2013/0342794 A1* | 12/2013 | Okada | ................ | G02B 5/3058 349/96 |
| 2017/0148823 A1* | 5/2017 | Nam | ................... | H01L 27/1218 |
| 2019/0094436 A1* | 3/2019 | Takeda | ............. | B29D 11/00644 |
| 2020/0103575 A1* | 4/2020 | Kumai | ................ | G02B 5/3058 |

FOREIGN PATENT DOCUMENTS

| | | | |
|---|---|---|---|
| JP | 2010066635 | A | 3/2010 |
| JP | 2012046822 | A | 3/2012 |
| JP | 2012103490 | A | 5/2012 |
| JP | 2012181420 | A | 9/2012 |
| JP | 2013130598 | A | 7/2013 |
| JP | 2014052439 | A | 3/2014 |
| JP | 2015034959 | A | 2/2015 |

OTHER PUBLICATIONS

May 31, 2016, Notification of Reasons for Refusal issued by the Japan Patent Office in the corresponding Japanese Patent Application No. 2015-212023.

Sep. 13, 2016, Official Decision of Refusal and Official Decision of Dismissal of Amendment issued by the Japan Patent Office in the corresponding Japanese Patent Application No. 2015-212023.

Jun. 19, 2019, Third Party Submission issued by the Japan Patent Office in the corresponding Japanese Patent No. 6377285.

The Japanese Anodizing Association the Surface Finishing Society of Japan, Surfaces of Aluminum Viewed by the Eyes of the Electron Microscopes, the 45th Commemorative Issue, Nov. 1, 2000, pp. 41 to 42.

The Handbook of Advanced Aluminum Technology, Nov. 18, 2006, pp. 83-87 and p. 92, Kallos Publishing Co. Ltd.

Kenzo Kobayashi et al., Influence of electrolyte on the development of y'-alumina in the barrier oxide layers formed on aluminum covered with a thin layer of thermal oxide, Journal of Japan Institute of Light Metals, Feb. 1986, pp. 81 to 88, vol. 36, No. 2.

Dec. 3, 2019, Office Action issued by the China National Intellectual Property Administration in the corresponding Chinese Patent Application No. 201680060125.0.

Apr. 23, 2020, Office Action issued by the China National Intellectual Property Administration in the corresponding Chinese Patent Application No. 201680060125.0.

* cited by examiner

FIG. 5

| | | Grid width [nm] | | | | |
|---|---|---|---|---|---|---|
| | | 35 | 40 | 45 | 50 | 55 |
| Tp [%] | 88.0 | | | | 17.3% | 31.3% |
| | 88.5 | | | 4.0% | 21.0% | 33.9% |
| | 89.0 | | | 8.9% | 24.6% | 36.5% |
| | 89.5 | | | 13.7% | 28.2% | 38.9% |
| | 90.0 | | 0.9% | 18.3% | 31.7% | 41.2% |
| | 90.5 | | 6.5% | 22.9% | 35.0% | 43.5% |
| | 91.0 | | 12.0% | 27.3% | 38.4% | 45.7% |
| | 91.5 | 0.7% | 17.6% | 31.6% | 41.6% | |
| | 92.0 | 6.8% | 23.2% | 35.8% | 44.7% | |
| | 92.5 | 13.4% | 28.8% | 39.9% | 47.8% | |
| | 93.0 | 20.4% | 34.4% | 43.9% | | |
| | 93.5 | 28.0% | 40.0% | 47.8% | | |
| | 94.0 | 36.0% | 45.7% | | | |
| CR | 500 | 43.3% | 49.8% | 50.6% | 48.8% | 46.0% |

POLARIZING ELEMENT AND METHOD OF PRODUCING SAME

CROSS-REFERENCE TO RELATED APPLICATION

This application claims priority of Japanese Patent Application No. 2015-212023 filed in Japan on Oct. 28, 2015, the entire disclosure of which is incorporated into this application for reference.

TECHNICAL FIELD

This disclosure relates to a polarizing element having a wire grid structure and a method of producing this polarizing element.

BACKGROUND

A polarizing element is an optical element that absorbs light polarized in one direction and transmits light polarized in a direction perpendicular to this direction. In principle, liquid-crystal displays are required to include polarizing elements. Particularly in the case of a liquid-crystal display that uses a high-intensity light source, such as a transmission-type LCD projector, a polarizing element needs to have excellent heat resistance due to being exposed to intense radiation, and is also demanded to have a size on the scale of a few centimeters and a high extinction ratio. Wire grid inorganic polarizing elements have been proposed in response to these demands (for example, refer to PTL 1 and 2).

A wire grid polarizing element has a structure (wire grid structure) in which many wires of conductor (reflection layer) that extend in one direction are arranged on a substrate at a narrower pitch (tens of nanometers to hundreds of nanometers) than the operating wavelength band. When the polarizing element is irradiated with light, light that is polarized parallel to the extension direction of the wires (TE waves (S waves)) cannot pass through the polarizing element, whereas light that is polarized perpendicularly to the extension direction of the wires (TM waves (P waves)) can pass through the polarizing element. Wire grid polarizing elements have excellent heat resistance, can be made with a relatively large size, and have a high extinction ratio, which makes them suitable for LCD projector applications and the like.

For example, in the case of a wire grid polarizing element described in PTL 1, a grid structure layer in which protrusion-like lines are arranged at specific intervals is formed on a transparent substrate. The grid structure layer is formed from resin. Next, sputter etching is used to process tips of the protrusion-like lines into pointed shapes. Thereafter, oblique irradiation with metal particles is performed to form a metal layer around each tip of the grid structure layer made of resin.

In the case of a wire grid polarizing element described in PTL 2, metal wires are formed on a transparent substrate and then a dielectric layer and an absorption layer are provided on the metal wires. Light polarized parallel to an extension direction of the wires (TE waves (S waves)) is selectively absorbed by the dielectric layer and the absorption layer. By using this wire grid polarizing element in an LCD projector, it is possible to reduce deterioration of image quality caused by a ghost, or the like, generated when returning light that is reflected off the surface of the polarizing element is reflected again inside the LCD projector.

PATENT LITERATURE

PTL 1: JP 2010-66635 A
PTL 2: JP 2014-52439 A

SUMMARY

Technical Problem

However, in the case of a conventional wire grid polarizing element, due to the relationship between the pitch and grid width (width of the grid in the arrangement direction of the grid), which is in accordance with the operating wavelength band, light transmittance decreases, in principle, toward shorter wavelengths. In a visible light region used in an LCD projector (red band: wavelength $\lambda=600$ nm to 680 nm; green band: wavelength $\lambda=520$ nm to 590 nm; blue band: wavelength $\lambda=430$ nm to 510 nm), it is the blue band for which transmittance is lowest. It is known that transmittance can be increased by making the grid width of a polarizing element narrower. However, in reality, the formation of a pattern having a narrower grid width has a high level of difficulty, for example in terms of production variations, and the adoption of a narrower grid width also makes it harder to ensure reliability.

In light of problems such as set forth above, an objective of this disclosure is to provide a polarizing element that enables improvement of a transmission axis direction light transmission characteristic and a method of producing this polarizing element.

Solution to Problem

In order to solve the problems set forth above, a polarizing element according to the present disclosure is a polarizing element having a wire grid structure and including: a transparent substrate; and grid-shaped protrusions that are arranged on the transparent substrate at a smaller pitch than a wavelength of operating band light and that extend in a specific direction, wherein the grid-shaped protrusions include a reflection layer formed on the transparent substrate, and the reflection layer includes a metal layer and an oxide layer that covers a side surface of the metal layer as viewed in the specific direction and is formed from an oxide of a constituent metal of the metal layer.

In the polarizing element according to the present disclosure, it is preferable that the grid-shaped protrusions have a grid width, defined as width of the grid-shaped protrusions in an arrangement direction thereof, of 35 nm to 45 nm, and that the polarizing element satisfies 28%≤x≤48%, where x stands for a proportion of the width of the oxide layer to the grid width in the arrangement direction of the grid-shaped protrusions.

In the polarizing element according to the present disclosure, it is preferable that the grid-shaped protrusions further include a dielectric layer formed on the reflection layer and an absorption layer formed on the dielectric layer.

In the polarizing element according to the present disclosure, it is preferable that a surface of the polarizing element at which light is incident is covered by a protective film formed from a dielectric.

In the polarizing element according to the present disclosure, it is preferable that the oxide layer has an increasing degree of oxidation of the constituent metal of the metal layer with increasing proximity to an outermost surface of the oxide layer.

Moreover, in order to solve the problems set forth above, a method of producing a polarizing element according to the present disclosure is a method of producing a polarizing element having a wire grid structure that includes: forming a metal layer that is arranged on a transparent substrate at a smaller pitch than a wavelength of operating band light and that extends in a specific direction; forming a dielectric layer on the metal layer; forming an absorption layer on the dielectric layer; and forming an oxide layer that is formed from an oxide of a constituent metal of the metal layer at a side surface of the metal layer by oxidizing the metal layer after the absorption layer is formed.

Furthermore, in order to solve the problems set forth above, the metal layer may be oxidized by heat treatment in the forming of the oxide layer in the method of producing a polarizing element.

Also, in order to solve the problems set forth above, the oxide layer may have an increasing degree of oxidation of the constituent metal of the metal layer with increasing proximity to an outermost surface of the oxide layer in the method of producing a polarizing element.

Moreover, in order to solve the problems set forth above, a method of producing a polarizing element according to the present disclosure is a method of producing a polarizing element that includes a transparent substrate and grid-shaped protrusions that are arranged on the transparent substrate at a smaller pitch than a wavelength of operating band light and that extend in a specific direction, and that has a wire grid structure in which the grid-shaped protrusions have a grid width, defined as width of the grid-shaped protrusions in an arrangement direction thereof, of 35 nm to 45 nm, and has a transmission characteristic of transmission axis transmittance of 93.5% or more when incident light is green band light having a wavelength λ of 520 nm to 590 nm, the method including: forming a metal layer that is arranged on the transparent substrate at a smaller pitch than a wavelength of operating band light and that extends in the specific direction; forming a dielectric layer on the metal layer; forming an absorption layer on the dielectric layer; and forming an oxide layer that is formed from an oxide of a constituent metal of the metal layer at a side surface of the metal layer by oxidizing the metal layer after the absorption layer is formed, wherein the oxide layer is formed with a thickness within a range for which 28%≥x<48%, where x stands for a proportion of the combined width of the oxide layer present at a left side and a right side of the metal layer to the grid width in the arrangement direction as viewed in the specific direction, such that the transmission characteristic is satisfied.

Advantageous Effect

The polarizing element and method of producing the same according to the present disclosure enable improvement of a transmission axis direction light transmission characteristic.

BRIEF DESCRIPTION OF THE DRAWINGS

In the accompanying drawings:
FIG. 5 illustrates a proportion of width of oxide layer to grid width for which specific transmission axis transmittances and a specific contrast are obtained, dependent on the grid width, as calculated by simulation for the polarizing element illustrated in FIG. 1.

DETAILED DESCRIPTION

The following describes embodiments of the presently disclosed techniques with reference to the drawings. However, the presently disclosed techniques are not limited to the following embodiments and various alterations that do not deviate from the essence thereof may, of course, be made.

Figure 1:
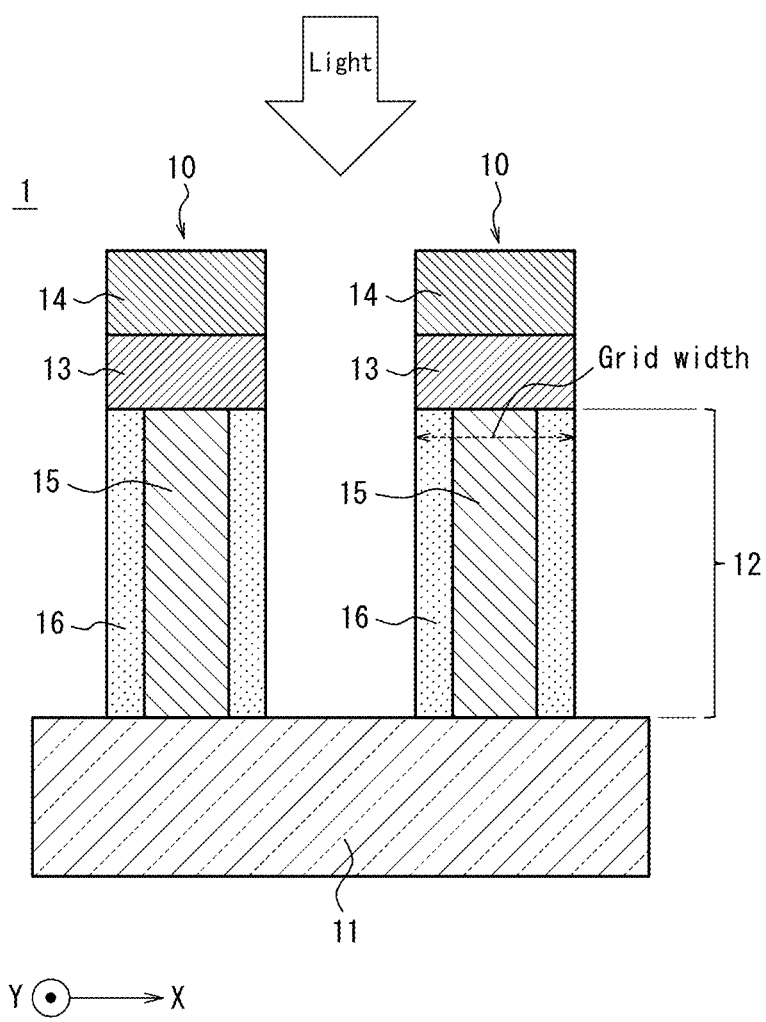
FIG. 1 is a cross-sectional view illustrating configuration of a polarizing element according to one disclosed embodiment.

FIG. 1 is a schematic cross-sectional view illustrating configuration of a polarizing element 1 according to one disclosed embodiment. As illustrated in FIG. 1, the polarizing element 1 includes a transparent substrate 11 that is transparent with respect to operating band light and grid-shaped protrusions 10 that are arranged on one surface of the transparent substrate 11 at a smaller pitch than the wavelength of operating band light. The grid-shaped protrusions 10 include a reflection layer 12 formed on the transparent substrate 11, a dielectric layer 13 formed on the reflection layer 12, and an absorption layer 14 formed on the dielectric layer 13. In other words, the polarizing element 1 has a one-dimensional grid-shaped wire grid structure in which the grid-shaped protrusions 10, having the reflection layer 12, the dielectric layer 13, and the absorption layer 14 stacked in this order from the transparent substrate 11, are arranged at specific intervals on the transparent substrate 11.

In the following description, a direction in which the one-dimensional grid of the grid-shaped protrusions 10 extends is referred to as the Y axis direction (specific direction). Moreover, a direction in which the grid-shaped protrusions 10 are arranged that is perpendicular to the Y axis direction along the transparent substrate 11 is referred to as the X axis direction. In this case, the polarizing element 1 is irradiated with light at a side of the transparent substrate 11 at which the grid-shaped protrusions 10 are formed and preferably from a direction that is perpendicular to the X axis direction and the Y axis direction. The width of the grid-shaped protrusions 10 in the X axis direction is referred to below as the grid width.

The absorption layer 14 is made from a material such as a metal or a semiconductor having a non-zero extinction coefficient as an optical constant. In other words, the absorption layer 14 is made from a material that displays a light absorption effect. The polarizing element 1 may further include a metal film of Ta, W, Nb, Ti, or the like as a diffusion barrier layer between the dielectric layer 13 and the absorption layer 14 to prevent diffusion of the absorption layer 14. Moreover, the polarizing element 1 may include a deposited protective film of a dielectric such as $SiO_2$ at a surface at which light is incident to improve reliability in terms of moisture resistance or the like, as necessary, so long as any change in optical characteristics does not have an effect in application.

The polarizing element 1 exploits the four effects of transmission, reflection, interference, and selective light absorption of polarized light waves through optical anisotropy to attenuate polarized light waves having an electric field component parallel to the Y axis direction (TE waves (S waves)) and transmit polarized light waves having an electric field component parallel to the X axis direction (TM waves (P waves)). Accordingly, the Y axis direction is an absorption axis direction of the polarizing element 1 and the X axis direction is a transmission axis direction of the polarizing element 1.

TM waves that have passed through the absorption layer 14 and the dielectric layer 13 are transmitted through the reflection layer 12 with a high transmittance. In contrast, TE waves are attenuated due to the light absorption effect of the absorption layer 14. The one-dimensional grid-shaped reflection layer 12 functions as a wire grid and reflects TE waves that have passed through the absorption layer 14 and the dielectric layer 13. Through appropriate adjustment of the thickness and refractive index of the dielectric layer 13, a portion of TE waves that are reflected by the reflection layer 12 are absorbed while passing through the absorption layer 14, and a portion of the TE waves are reflected and return to the reflection layer 12. Light that has passed through the absorption layer 14 is attenuated by interference. In this manner, the polarizing element 1 enables desired polarized light characteristics to be obtained through the selective attenuation of TE waves.

The transparent substrate 11 is made from a material that is transparent with respect to operating band light and has a refractive index of 1.1 to 2.2. For example, the transparent substrate 11 may be made from glass, sapphire, rock crystal, or the like. In the present embodiment, it is preferable to use a rock crystal or sapphire substrate having high thermal conductivity as the constituent material of the transparent substrate 11. This provides the transparent substrate 11 with high light resistance against intense light and makes the transparent substrate 11 suitable for a polarizing element of an optical engine in a projector that generates a large amount of heat.

Moreover, when the transparent substrate 11 is formed from an optically active crystal such as rock crystal, excellent optical characteristics can be obtained by arranging the grid-shaped protrusions 10 in a parallel direction or a perpendicular direction relative to the optic axis of the crystal. The optic axis is a directional axis for which the difference in refractive indices of an ordinary ray (O) and an extraordinary ray (E) of light travelling in the direction is smallest.

Depending on the intended application of the polarizing element 1, glass, and in particular quartz (refractive index 1.46) or soda lime glass (refractive index 1.51), may be used. No specific limitations are placed on the chemical composition of the glass material. For example, a cheap glass material such as silicate glass that is widely available as optical glass may be used so as to lower production costs.

The reflection layer 12 is an array of thin metal films that extend in a belt shape in the Y axis direction (absorption axis) on the transparent substrate 11. In other words, the reflection layer 12 functions as a wire grid polarizer, and among light radiated toward the surface of the transparent substrate 11 on which the wire grid is formed, the reflection layer 12 causes attenuation of polarized light waves having an electric field component in a parallel direction (Y axis direction) to the direction in which the wire grid extends (TE waves (S waves)), and transmits polarized light waves having an electric field component in a perpendicular direction (X axis direction) to the direction in which the wire grid extends (TM waves (P waves)).

In the present embodiment, the reflection layer 12 includes a metal layer 15 that extends from the transparent substrate 11 in a direction perpendicular to the X axis direction and the Y axis direction and an oxide layer 16 that covers a side wall of the metal layer 15 as viewed in the specific direction.

No specific limitations are placed on the constituent material of the metal layer 15 other than being a material that is reflective with respect to operating band light. For example, the constituent material of the metal layer 15 may be a simple substance of a metal such as Al, Ag, Cu, Mo, Cr, Ti, Ni, W, Fe, Si, Ge, or Te, an alloy containing any of these metals, or a semiconductor material. Besides metal materials, the metal layer 15 may include a resin film or an inorganic film other than a metal that is provided with high surface reflectance through coloring or the like.

The oxide layer 16 is formed through oxidation of a constituent metal of the metal layer 15 (i.e., through an oxidation reaction of the constituent metal of the metal layer 15 and oxygen). For example, in a case in which the metal layer 15 is formed from Al, the oxide layer 16 is formed from $Al_2O_3$, and in a case in which the metal layer 15 is formed from Si, the oxide layer 16 is formed from $SiO_2$. In other words, a metal layer having the same width in the X axis direction as the desired grid width is formed, the dielectric layer 13 is formed on this metal layer, and the absorption layer 14 is formed on the dielectric layer 13. Thereafter, the metal layer is subjected to specific oxidation treatment such that oxidation proceeds from the surface of the metal layer to form the oxide layer 16.

Figure 2:
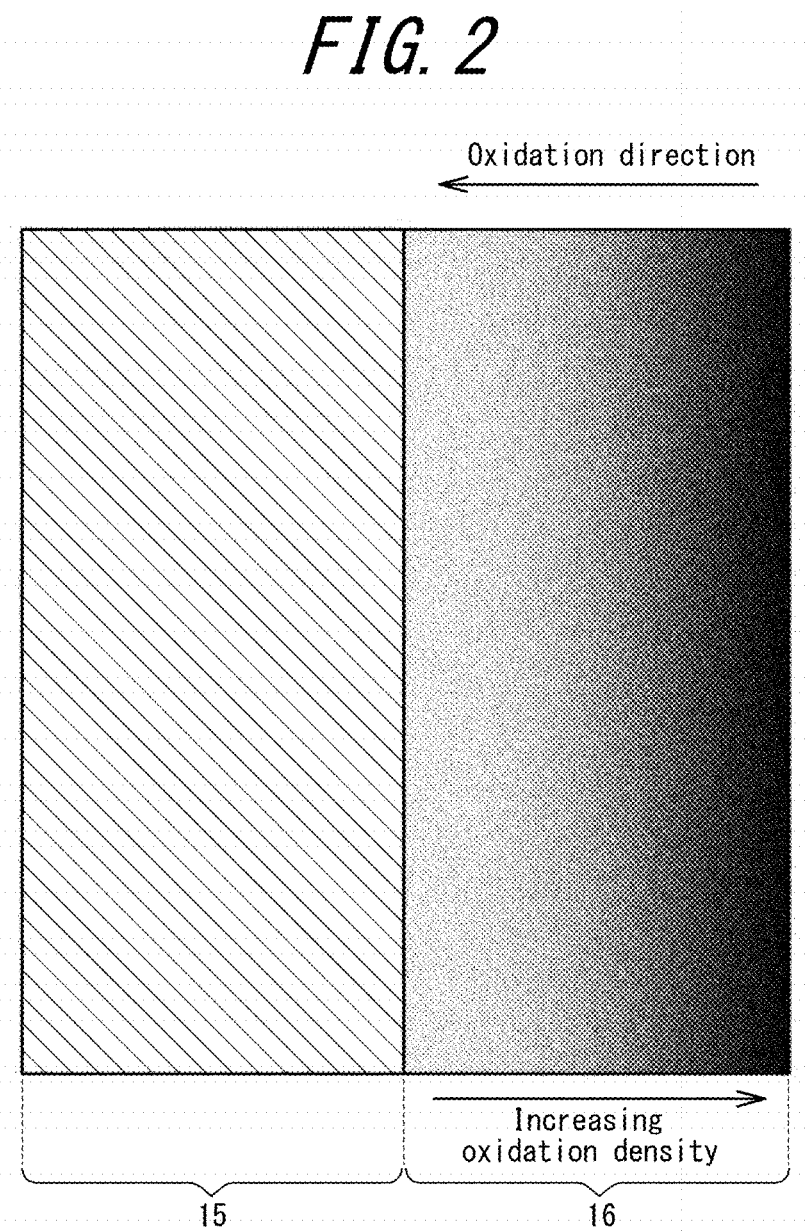
FIG. 2 illustrates, in greater detail, configuration of an oxide layer illustrated in FIG. 1.

In order that the oxidation reaction of the constituent metal of the metal layer 15 and oxygen can continue, it is necessary for metal atoms of the constituent metal of the metal layer 15 and oxygen atoms to pass through the oxide layer by diffusion. One example of an environment in which the activation energy required for diffusion can easily be obtained is heat treatment under high temperature. The heat treatment enables oxidation of the constituent metal of the metal layer 15 to form an oxide layer 16 having a specific thickness in the X axis direction. In this heat treatment, the oxidation reaction starts from the outermost surface of the pre-oxidation treatment metal layer, and the oxidation treatment then progresses to an inner part of the metal layer through diffusion. As a consequence, the oxide layer 16 has an increasing degree of oxidation (proportion of the constituent metal of the metal layer 15 that is oxidized) toward an outermost surface of the oxide layer 16 from the grid center as illustrated in FIG. 2.

The width (X axis direction thickness) of the oxide layer 16 can be controlled by controlling the temperature and time of the heat treatment. As previously explained, the metal layer 15 reflects light. In contrast, the oxide layer 16 can transmit light. Therefore, controlling the width of the oxide layer 16 changes the area of the metal layer 15 as viewed in the direction of incidence of light, and thereby changes the amount of light that is reflected by the reflection layer 12. Accordingly, light transmission characteristics of the polarizing element 1 can be controlled by controlling a proportion of the width of the oxide layer 16 to the grid width.

Plasma oxidation using oxygen gas or ozone oxidation using ozone water or gas may also be considered as oxidation treatment for forming the oxide layer 16. However, oxidation treatment by plasma or ozone requires a more complicated process than heat treatment. For example, in the case of plasma oxidation, it is necessary to take into account damage to the grid caused by the plasma. Moreover, plasma oxidation may lead to higher production costs due to the need for a vacuum apparatus to perform treatment. In the same way, ozone oxidation requires extremely expensive equipment such as an ozone generator, a reactor, and a waste ozone processor. Moreover, it is also important to provide a safe environmental system during handling and operator training because ozone is harmful to the human body and, depending on the ozone concentration, there is a possibility of an explosion or fire occurring.

It is anticipated that the grid width of the reflection layer 12 may become larger than the grid width of the pre-oxidation metal layer (desired grid width) as a result of the oxide layer 16 being formed by oxidation of the metal layer. However, since such a change in grid width is extremely small, the grid width of the reflection layer 12 is taken to be the same as the grid width of the pre-oxidation metal layer (desired grid width) in the following description.

The dielectric layer 13 is formed with a film thickness such that the phase of polarized light that has passed through the absorption layer 14 and been reflected by the reflection layer 12 is shifted by a half wavelength relative to polarized light reflected by the absorption layer 14. Specifically, the film thickness is appropriately set in a range of 1 nm to 500 nm that enables adjustment of the phase of polarized light and enables an increased interference effect.

The constituent material of the dielectric layer 13 may be a commonly used material, examples of which include metal oxides such as $SiO_2$, $Al_2O_3$, beryllium oxide, and bismuth oxide; $MgF_2$, cryolite, germanium, titanium dioxide, silicon, magnesium fluoride, boron nitride, boron oxide, tantalum oxide, and carbon; and combinations of any of the preceding examples. The refractive index of the dielectric layer 13 is preferably more than 1.0 and not more than 2.5. Polarizing element characteristics may be controlled through the material of the dielectric layer 13 since optical characteristics of the reflection layer 12 are also influenced by the refractive index at the periphery of the reflection layer 12.

The absorption layer 14 is made from at least one material having a non-zero extinction coefficient as an optical constant and displaying a light absorption effect, such as a metal or a semiconductor. The material of the absorption layer 14 is selected in accordance with the wavelength range of used light. Examples of metal materials that can be used include simple substances of Ta, Al, Ag, Cu, Au, Mo, Cr, Ti, W, Ni, Fe, and Sn, and alloys including any of these metals. Examples of semiconductor materials that can be used include Si, Ge, Te, ZnO, and silicide materials (for example, ($\beta$-$FeSi_2$, $MgSi_2$, $NiSi_2$, $BaSi_2$, $CrSi_2$, $CoSi_2$, and TaSi). As a result, the polarizing element 1 can be provided with a high extinction ratio with respect to the used visible light region.

Note that in a case in which a semiconductor material is used as the absorption layer 14, the band gap energy of the semiconductor is required to be no higher than the operating band because the band gap energy influences the absorption effect. For example, in use with visible light, it is necessary to use a material that absorbs at wavelengths of 400 nm or higher and thus has a band gap of 3.1 eV or lower.

The absorption layer 14 can be formed with a high film density by vapor deposition or sputtering. Moreover, the absorption layer 14 may include two or more layers formed from different materials.

The polarizing element 1 configured as described above can exploit the four effects of transmission, reflection, interference, and selective light absorption of polarized light waves to attenuate polarized light waves having an electric field component in the Y axis direction parallel to the grid of the reflection layer 12 (TE waves (S waves)) and transmit polarized light waves having an electric field component in the X axis direction perpendicular to the grid (TM waves (P waves)). In other words, TE waves are attenuated by the selective light absorption effect of polarized light waves by the absorption layer 14, and TE waves that have passed through the absorption layer 14 and the dielectric layer 13 are reflected by the grid-shaped reflection layer 12 that functions as a wire grid. Through appropriate adjustment of the thickness and refractive index of the dielectric layer 13, a portion of TE waves reflected by the reflection layer 12 can be reflected when passing through the absorption layer 14 such as to return to the reflection layer 12, and light that has passed through the absorption layer 14 can be attenuated by interference. In this manner, desired polarized light characteristics can be obtained through the selective attenuation of TE waves.

In the polarizing element 1 according to the present disclosure, the reflection layer 12 includes the metal layer 15 and the oxide layer 16 that covers only a side surface of the metal layer 15 and is formed from an oxide of a constituent metal of the metal layer 15. Therefore, controlling a proportion of the width of the oxide layer 16 to the gird width of the grid-shaped protrusions 10 can change the area of a section that reflects light as viewed in the direction of incidence of light, and can thereby control light transmission characteristics of the polarizing element 1.

Note that a protective film formed from a dielectric may be formed on the surface of the polarizing element 1 (surface at which the wire grid is formed) by chemical vapor deposition (CVD) film formation or atomic layer deposition (ALD) film formation. This can inhibit oxidation reaction of the metal layer 15 progressing beyond the required level.

Figure 3:
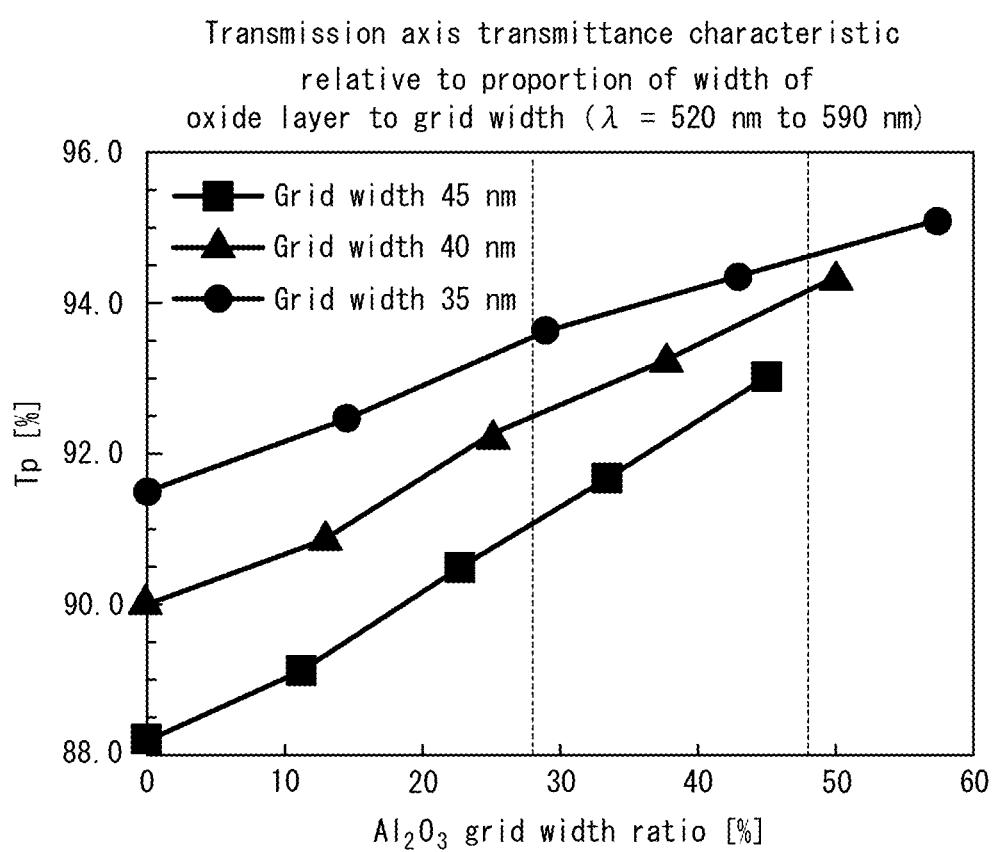
FIG. 3 is a graph illustrating a transmission axis transmittance characteristic relative to a proportion of width of oxide layer to grid width as calculated by simulation for the polarizing element illustrated in FIG. 1.
Figure 4:
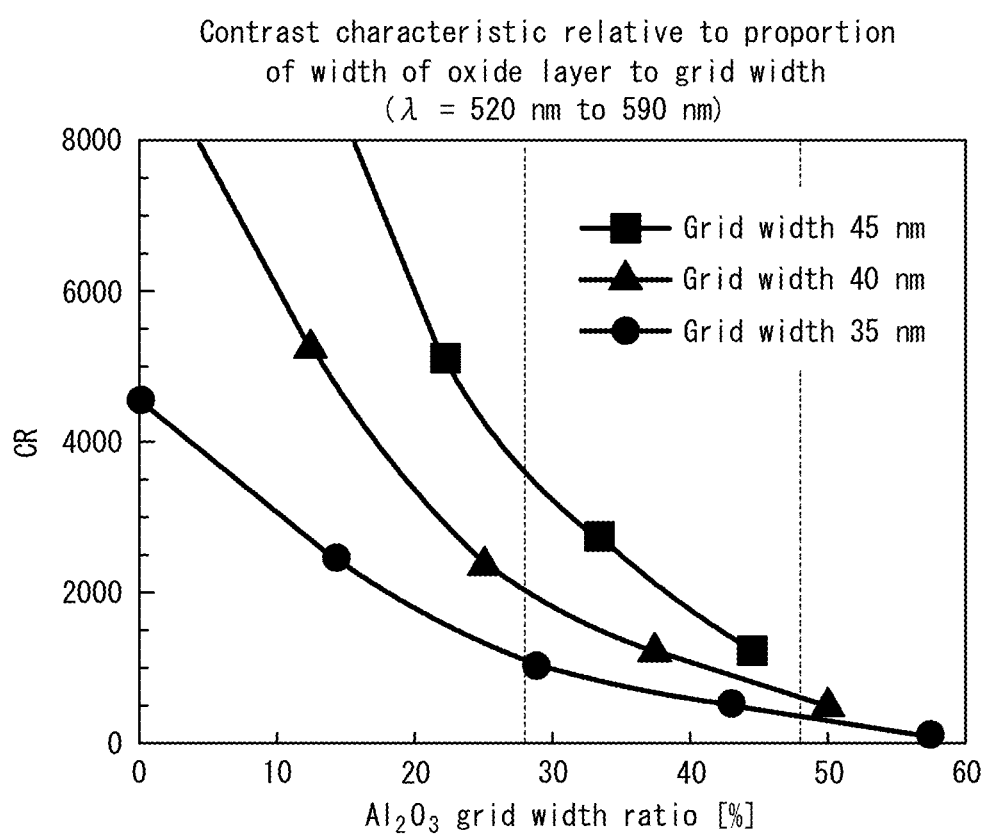
FIG. 4 is a graph illustrating a contrast characteristic relative to a proportion of width of oxide layer to grid width as calculated by simulation for the polarizing element illustrated in FIG. 1.

FIG. 3 illustrates a relationship between transmission axis transmittance (Tp) and a proportion of the width of the oxide layer 16 to the gird width of the grid-shaped protrusions 10 in the polarizing element 1. FIG. 4 illustrates a relationship between contrast (CR=Tp/Ts (absorption axis transmittance)) and a proportion of the width of the oxide layer 16 to the grid width of the gird-shaped protrusions 10 in the polarizing element 1 (i.e., a proportion of the combined width of the oxide layer 16 present at both sides (right side and left side) of the metal layer 15 to the grid width of the grid-shaped protrusions 10 in the X axis direction (arrangement direction of the grid-shaped protrusions 10) as viewed in the Y axis direction (extension direction of the grid-shaped protrusions 10)). More specifically, FIG. 3 illustrates how the transmission axis transmittance (Tp) of the polarizing element 1 changes when a proportion of the width of the oxide layer 16 to the grid width is varied at various grid widths of 35 nm, 40 nm, and 45 nm. Moreover, FIG. 4 illustrates how the contrast of the polarizing element 1 changes when a proportion of the width of the oxide layer 16 to the grid width is varied at various grid widths of 35 nm, 40 nm, and 45 nm. Note that FIGS. 3 and 4 illustrate simulation results for a case in which incident light is green band light (wavelength $\lambda$=520 nm to 590 nm).

As illustrated in FIG. 3, the transmission axis transmittance increases as the grid width narrows. Moreover, at the same grid width, the transmission axis transmittance increases as a proportion of the width of the oxide layer 16 ($Al_2O_3$) to the grid width increases. For example, roughly the same transmission axis transmittance is obtained in both a case in which the grid width is 35 nm and a proportion of the width of the oxide layer 16 to the grid width is 0% and a case in which the grid width is 45 nm and a proportion of the width of the oxide layer 16 to the grid width is approximately 33%. As previously explained, narrowing of the grid width has a high level of difficulty, for example in terms of production variations, and narrowing of the width also makes it harder to increase reliability. However, by controlling a proportion of the width of the oxide layer 16 to the grid width in the present disclosure, it is possible to obtain a transmission axis transmittance corresponding to a narrower grid width than the actual grid width. Consequently, it is possible to restrict production variations and increase reliability because the necessity of narrowing the grid width in accordance with desired light transmission characteristics is eliminated.

Moreover, FIG. 4 illustrates that for each of the grid widths, the contrast decreases as a proportion of the width of the oxide layer 16 to the grid width increases (i.e., as the transmission axis transmittance increases). The above results demonstrate that transmittance characteristics of the polarizing element 1 are improved and any transmittance can be obtained.

As previously explained, one example of an application for the polarizing element 1 is in a projector. In a case in which the polarizing element 1 is used in a projector, the polarizing element 1 is required to have excellent characteristics such as a transmission axis transmittance of 93.5% or more, and preferably a contrast of more than 500.

FIG. 5 illustrates, at various grid widths (35 nm, 40 nm, 45 nm, 50 nm, and 55 nm), a proportion of the width of the oxide layer 16 to the grid width for which specific transmission axis transmittances (Tp) are obtained and a proportion of the width of the oxide layer 16 to the grid width for which a contrast (CR) of 500 is obtained.

As illustrated in FIG. 5, a proportion of the width of the oxide layer 16 to the grid width for which a contrast of 500 is obtained is largest at a grid width of 45 nm. Specifically, a contrast of 500 is obtained when the width of the oxide layer 16 is 50.6% of the grid width in this case. Therefore, it is preferable to set a proportion of the width of the oxide layer 16 to the grid width is roughly 50% or less in order to obtain a contrast of more than 500.

Moreover, the transmission axis transmittance becomes 93.5% or more when a proportion of the width of the oxide layer 16 to the grid width is 28.0% or more at a grid width of 35 nm, when a proportion of the width of the oxide layer 16 to the grid width is 40.0% or more at a grid width of 40 nm, and when a proportion of the width of the oxide layer 16 to the grid width is 47.8% or more at a grid width of 45 nm. Accordingly, in order to achieve a transmission axis transmittance of 93.5% or more at a grid width of 35 nm to 45 nm, it is preferable that 28%≤x<48%, where x % stands for a proportion of the width of the oxide layer 16 to the grid width.

It should be noted that although an example has been described in which incident light is green band light (wavelength λ=520 nm to 590 nm), the same effect can be achieved when the incident light is red band light (wavelength λ=600 nm to 680 nm) or blue band light (wavelength λ=430 nm to 510 nm) even though a proportion of the width of the oxide layer 16 to the grid width (x %) differs slightly.

In this manner, the polarizing element 1 according to the present embodiment includes the transparent substrate 11 and the grid-shaped protrusions 10 that are arranged on the transparent substrate 11 at a smaller pitch than the wavelength of operating band light and extend in the specific direction. The grid-shaped protrusions 10 include the reflection layer 12 formed on the transparent substrate 11. Moreover, the reflection layer 12 includes the metal layer 15 and the oxide layer 16 that covers a side surface of the metal layer 15 as viewed in the specific direction and is formed from an oxide of a constituent metal of the metal layer 15.

As a result of the reflection layer 12 including the metal layer 15 and the oxide layer 16 covering the side surface of the metal layer 15, variation of the thickness of the oxide layer 16 as viewed in the direction of incidence of light changes the area of a section that reflects light (metal layer 15), and thereby enables improvement of light transmission characteristics of the polarizing element 1. Moreover, light transmission characteristics corresponding to a narrow grid width can be achieved without narrowing the actual grid width. Consequently, mask pattern collapse in photolithography or the like and grid collapse in dry etching or the like, which may occur as a consequence of forming a narrow grid, are less likely to occur, which can reduce the level of difficulty of producing the polarizing element 1, restrict production variations, and improve reliability.

It should be noted that although the presently disclosed techniques have been described based on the drawings and embodiments, a person of ordinary skill in the technical field could easily make various alterations or revisions based on this disclosure. Therefore, such alterations and revisions are also included within the scope of the presently disclosed techniques.

REFERENCE SIGNS LIST 1 polarizing element
10 grid-shaped protrusions
11 transparent substrate
12 reflection layer
13 dielectric layer
14 absorption layer
15 metal layer
16 oxide layer

The invention claimed is:

1. A polarizing element having a wire grid structure, comprising:
   a transparent substrate; and
   grid-shaped protrusions that are arranged on the transparent substrate at a smaller pitch than a wavelength of operating band light and that extend in a specific direction, wherein
   the grid-shaped protrusions include a reflection layer formed on the transparent substrate,
   the reflection layer includes a metal layer and oxide layers that cover side surfaces of the metal layer as viewed in the specific direction and is formed from an oxide of a constituent metal of the metal layer, and
   the grid-shaped protrusions have a grid width, the grid width being defined as a width of the grid-shaped protrusions in an arrangement direction thereof, of 35 nm to 45 nm, and that the polarizing element satisfies 28%≤x<48%, where x stands for a proportion of a combined width of the oxide layers to the grid width in the arrangement direction of the grid-shaped protrusions.

2. The polarizing element according to claim 1, wherein the grid-shaped protrusions further include a dielectric layer formed on the reflection layer and an absorption layer formed on the dielectric layer.

3. The polarizing element according to claim 1, wherein each oxide layer has an increasing degree of oxidation of the constituent metal of the metal layer with increasing proximity to an outermost surface of each oxide layer.

4. A method of producing a polarizing element having a wire grid structure, comprising:

forming a metal layer that is arranged on a transparent substrate at a smaller pitch than a wavelength of operating band light and that extends in a specific direction;

forming a dielectric layer on the metal layer;

forming an absorption layer on the dielectric layer; and forming oxide layers from an oxide of a constituent metal of the metal layer at side surfaces of the metal layer by oxidizing the metal layer after the absorption layer is formed, wherein grid-shaped protrusions include the metal layer, the dielectric layer, the absorption layer and the oxide layers, and have a grid width, the grid width being defined as a width of a grid-shaped protrusion in an arrangement direction thereof, of 35 nm to 45 nm, and that the polarizing element satisfies 28%≤x<48%, where x stands for a proportion of a combined width of the oxide layers to the grid width in the arrangement direction of the grid-shaped protrusion.

5. The method of producing a polarizing element according to claim 4, wherein the metal layer is oxidized by heat treatment in the forming of the oxide layers.

6. The method of producing a polarizing element according to claim 5, wherein each oxide layer has an increasing degree of oxidation of the constituent metal of the metal layer with increasing proximity to an outermost surface of each oxide layer.

7. A method of producing a polarizing element that includes a transparent substrate and grid-shaped protrusions that are arranged on the transparent substrate at a smaller pitch than a wavelength of operating band light and that extend in a specific direction, the grid-shaped protrusions having a grid width, the grid width being defined as a width of the grid-shaped protrusions in an arrangement direction thereof, of 35 nm to 45 nm, and the polarizing element having a transmission characteristic of transmission axis transmittance of 93.5% or more when incident light is green band light having a wavelength $\lambda$ of 520 nm to 590 nm, the method comprising:

forming a metal layer that is arranged on the transparent substrate at a smaller pitch than a wavelength of operating band light and that extends in the specific direction;

forming a dielectric layer on the metal layer;

forming an absorption layer on the dielectric layer; and forming oxide layers from an oxide of a constituent metal of the metal layer at side surfaces of the metal layer by oxidizing the metal layer after the absorption layer is formed, wherein the grid-shaped protrusions include the metal layer, the dielectric layer, the absorption layer and the oxide layers, and the oxide layers being formed with a thickness within a range for which 28%≤x<48%, where x stands for a proportion of a combined width of an oxide layer present at a left side and an oxide layer present at a right side of the metal layer to the grid width in the arrangement direction as viewed in the specific direction, such that the transmission characteristic is satisfied.

* * * * *